US008106947B2

(12) United States Patent
Fujiyama et al.

(10) Patent No.: US 8,106,947 B2
(45) Date of Patent: Jan. 31, 2012

(54) IMAGE RECORDING AND REPRODUCING APPARATUS

(75) Inventors: Michihiro Fujiyama, Kyotanabe (JP); Daisuke Nakajima, Hirakata (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 1181 days.

(21) Appl. No.: 11/850,858

(22) Filed: Sep. 6, 2007

(65) Prior Publication Data

US 2008/0055415 A1 Mar. 6, 2008

(30) Foreign Application Priority Data

Sep. 6, 2006 (JP) ................................ 2006-241169

(51) Int. Cl.
*H04N 7/18* (2006.01)
*H04N 5/76* (2006.01)

(52) U.S. Cl. .................................... 348/143; 348/231.2

(58) Field of Classification Search .................. 348/143
See application file for complete search history.

(56) References Cited

U.S. PATENT DOCUMENTS 5,784,335 A * 7/1998 Deplante et al. ................ 367/72
6,169,840 B1 * 1/2001 Lemelson ..................... 386/201
6,834,157 B2 * 12/2004 Yamagishi .................... 386/224
6,885,809 B1 * 4/2005 Asada ........................... 386/241
2006/0004751 A1 * 1/2006 Ujino et al. ........................ 707/6
2006/0259938 A1 * 11/2006 Kinoshita et al. ............. 725/118
2007/0165114 A1 * 7/2007 Hirabayashi et al. ...... 348/231.2
2007/0242136 A1 * 10/2007 Biagiotti et al. .............. 348/180
2007/0263102 A1 * 11/2007 Hirabayashi et al. ...... 348/231.2
2007/0299976 A1 * 12/2007 Zafar et al. .................... 709/229

FOREIGN PATENT DOCUMENTS

JP 09-046638 A 2/1997
JP 11-164289 A 6/1999
JP 2004-120401 A 4/2004

* cited by examiner

*Primary Examiner* — Abdullahi Salad
*Assistant Examiner* — Richard G Keehn
(74) *Attorney, Agent, or Firm* — Westerman, Hattori, Daniels & Adrian, LLP

(57) ABSTRACT

An image recording and reproducing apparatus includes a group management information file creation circuit for, in recording, grouping recorded images at predetermined time intervals and creating, for each group, a group management information file storing group management information including a start time indicating the time when a first recorded image in a group is recorded, an end time indicating the time when a last recorded image in the group is recorded, an address at which index information about the first recorded image in the group is stored, and channel distance information indicating, for each channel, a group interval from a group including a last recorded image of a channel to the current group.

6 Claims, 12 Drawing Sheets

BACKWARD RETRIEVAL PROCESS
S71 ACQUIRE CH_DISTANCE INFORMATION CORRESPONDING TO SPECIFIED CHANNEL IN REFERENCE BASIS FILE AND SET THE ACQUIRED CH_DISTANCE INFORMATION AS ch_dis_org
S72 ch_dis_org IS 0, MAX OR OTHER THAN (0, MAX) ?
OTHER THAN (0, MAX)
0
MAX
S75 SECOND BACKWARD RETRIEVAL PROCESS
S73 IDENTIFY THE REFERENCE BASIS FILE AS TARGET BASIS FILE FOUND THROUGH BACKWARD RETRIEVAL
S74 FIRST BACKWARD RETRIEVAL PROCESS
RETURN 17-1
EXTERNAL DETECTION DEVICE
17-2
EXTERNAL DETECTION DEVICE
17-N
EXTERNAL DETECTION DEVICE
18
RECORDING START KEY
19
RECORDING COMMANDING DEVICE
15
CPU
1-1
CAMERA
ch1
1-2
CAMERA
ch2
1-N
CAMERA
chN
2
MONITOR
11
MPX (MULTIPLEXER)
12
IMAGE PROCESSING CIRCUIT
13
IMAGE COMPRESSION/ EXPANSION CIRCUIT
14
VOLATILE MEMORY
16
HDD

FIG. 2

| START TIME OF EACH BASIS FILE | 01/01 01:00 | 01/01 02:00 | 01/01 03:00 | ••• | 02/01 01:00 | 02/01 02:00 | ••• | 02/02 01:00 | 02/02 02:00 |
|---|---|---|---|---|---|---|---|---|---|
| CD [1] | 00 | 00 | 00 | ••• | 00 | 00 | ••• | 00 | 00 |
| CD [2] | FF | 00 | 00 | ••• | 13 | 00 | ••• | 34 | 00 |
| CD [3] | 00 | 00 | 01 | ••• | FE | FE | ••• | FE | FE |
| CD [4] | FF | FF | 00 | ••• | 00 | 01 | ••• | 00 | 01 |
| CD [5] | 00 | 01 | 02 | ••• | 00 | 00 | ••• | 00 | 01 |
| CD [6] | FF | FF | FF | ••• | FF | FF | ••• | FF | FF |
| CD [7] | FF | 00 | 00 | ••• | 13 | 00 | ••• | 34 | 35 |
| CD [8] | FF | FF | 00 | ••• | 00 | 01 | ••• | 00 | 01 |
| RECORDED CH | 1,3,5 | 1,2,3,7 | 1,2,4,7,8 | | 1,4,5,8 | 1,2,5,7 | | 1,4,5,8 | 1,2 |

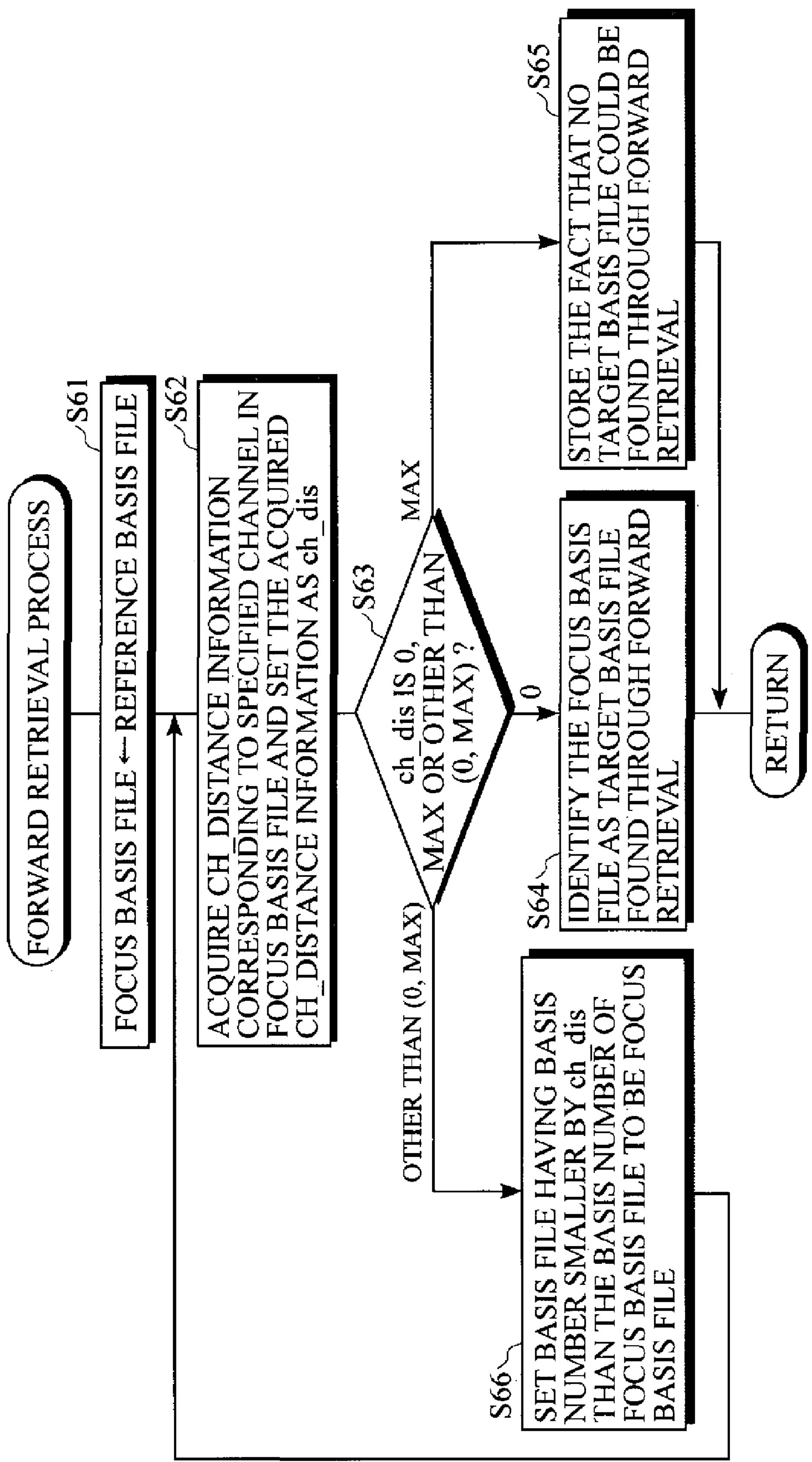
FIG. 9
FORWARD RETRIEVAL PROCESS
S61
FOCUS BASIS FILE ← REFERENCE BASIS FILE
S62
ACQUIRE CH_DISTANCE INFORMATION CORRESPONDING TO SPECIFIED CHANNEL IN FOCUS BASIS FILE AND SET THE ACQUIRED CH_DISTANCE INFORMATION AS ch_dis
S63
ch_dis IS 0, MAX OR OTHER THAN (0, MAX) ?
OTHER THAN (0, MAX)
0
MAX
S64
IDENTIFY THE FOCUS BASIS FILE AS TARGET BASIS FILE FOUND THROUGH FORWARD RETRIEVAL
S65
STORE THE FACT THAT NO TARGET BASIS FILE COULD BE FOUND THROUGH FORWARD RETRIEVAL
S66
SET BASIS FILE HAVING BASIS NUMBER SMALLER BY ch_dis THAN THE BASIS NUMBER OF FOCUS BASIS FILE TO BE FOCUS BASIS FILE
RETURN

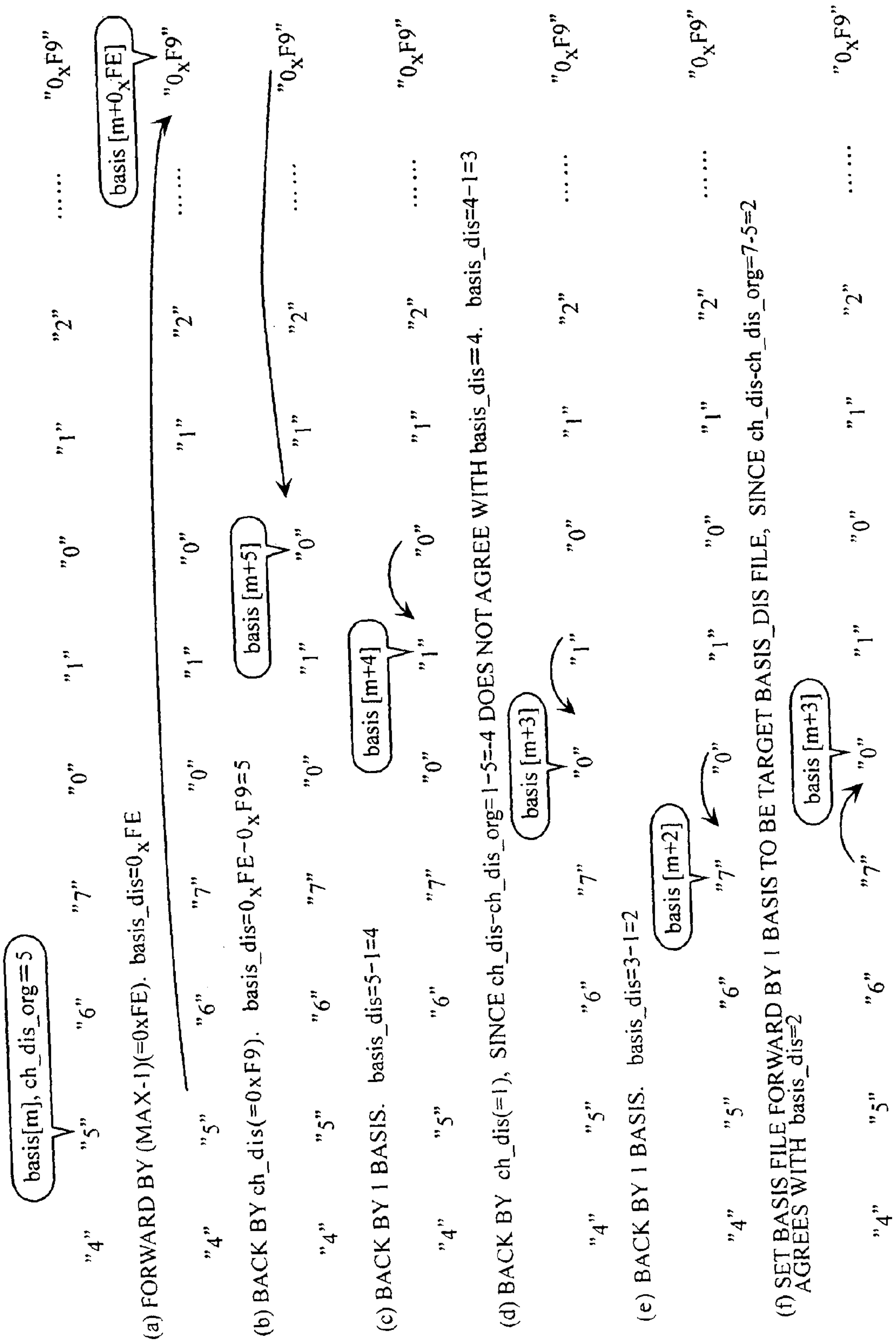
FIG. 13
basis[m], ch_dis_org=5
"4" "5" "6" "7" "0" "1" "0" "1" "2" ...... "0xF9"
(a) FORWARD BY (MAX-1)(=0xFE). basis_dis=0xFE
basis [m+0xFE]
(b) BACK BY ch_dis(=0xF9). basis_dis=0xFE−0xF9=5
basis [m+5]
(c) BACK BY 1 BASIS. basis_dis=5−1=4
basis [m+4]
(d) BACK BY ch_dis(=1), SINCE ch_dis-ch_dis_org=1−5=4 DOES NOT AGREE WITH basis_dis=4. basis_dis=4−1=3
basis [m+3]
(e) BACK BY 1 BASIS. basis_dis=3−1=2
basis [m+2]
(f) SET BASIS FILE FORWARD BY 1 BASIS TO BE TARGET BASIS_DIS FILE, SINCE ch_dis-ch_dis_org=7-5=2 AGREES WITH basis_dis=2
basis [m+3]

IMAGE RECORDING AND REPRODUCING APPARATUS

BACKGROUND OF THE INVENTION

1. Field of the Invention

The present invention relates to an image recording and reproducing apparatus for recording input images of a plurality of channels in such a way as to switch among the plurality of channels.

2. Description of the Related Art

An image recording and reproducing apparatus for recording input images of a plurality of channels in such a way as to switch among the plurality of channels is adapted to, every time a single image is recorded, store index information constituted by the time when this recorded image is recorded, the channel of this recorded image and the address at which this recorded image is stored.

In retrieval by specifying a recording time and a channel, such an image recording and reproducing apparatus has conventionally performed retrieval on the basis of the index information created for each recorded image, which has caused the problem of increase of the time period required for retrieval.

SUMMARY OF THE INVENTION

It is an object of the present invention to provide an image recording and reproducing apparatus capable of reducing the time period required for retrieval, in retrieval for an image.

An image recording and reproducing apparatus according to a first aspect of the present invention is an image recording and reproducing apparatus for recording input images of a plurality of channels in such a way as to switch among the plurality of channels during recording and for, every time a single image is recorded in a storage device, storing, in the storage device, index information including the channel of the image, the time when the image is recorded and the address at which the image is stored, the apparatus including: a group management information file creation circuit for, in recording, grouping recorded images at predetermined time intervals and creating, for each group, a group management information file storing group management information including a start time indicating the time when a first recorded image in a group is recorded, an end time indicating the time when a last recorded image in the group is recorded, an address at which index information about the first recorded image in the group is stored, and channel distance information indicating, for each channel, a group interval from a group including a last recorded image of a channel to the current group; a first retrieval circuit for, in retrieval by specifying a recording time and a channel, performing a primary retrieval process for retrieving a group management information file corresponding to a group including a recorded image of the specified channel and also being closest to the specified time, on the basis of the start times, the end times and the channel distance information corresponding to the specified channel in the respective group management information files; and a second retrieval circuit for performing a secondary retrieval process for retrieving a recorded image of the specified channel, the recorded image having a recording time closest to the specified time, on the basis of the index information of the recorded images in the group corresponding to the group management information file found through the primary retrieval process.

According to the first aspect of the present invention, the first retrieval circuit may include, for example, a circuit for retrieving, as a reference file, a group management information file having a start time and an end time between which the specified time exists, on the basis of the start times and the end times in the respective group management information files, a forward retrieval circuit for retrieving a group management information file corresponding to a group including a recorded image of the specified channel and having a smallest file interval from the reference file, out of the reference file and the group management information files which have been created earlier than the reference file, on the basis of the channel distance information corresponding to the specified channel in the reference file and in the group management information files which have been created earlier than the reference file, a backward retrieval circuit for retrieving a group management information file corresponding to a group including a recorded image of the specified channel and having a smallest file interval from the reference file, out of the reference file and the group management information files which have been created later than the reference file, on the basis of the channel distance information corresponding to the specified channel in the reference file and in the group management information files which have been created later than the reference file, and a circuit for determining a group management information file corresponding to a group including a recorded image of the specified channel and being closest to the specified time, on the basis of the results of the retrieval by the forward retrieval circuit and the backward retrieval circuit.

According to the first aspect of the present invention, the group management information file creation circuit may include, for example, an initial-value setting circuit for setting an initial value of the channel distance information for each channel in a first group management information file to a predetermined maximum value, and an updating circuit for updating the channel distance information in each of the group management information files. When the channel of a recorded image included in the group corresponding to the current group management information file is a recorded channel, for example, the updating circuit preferably sets the channel distance information corresponding to the recorded channel to 0, and preferably sets the channel distance information corresponding to the channel other than the recorded channel to the value of the corresponding channel distance information in the group management information file immediately preceding the current group management information file when the value of the corresponding channel distance information in the preceding group management information file is equal to the maximum value or smaller by one than the maximum value, and preferably sets the channel distance information corresponding to the channel other than the recorded channel to a value greater by one than the value of the corresponding channel distance information in the group management information file immediately preceding the current group management information file, when the value of the corresponding channel distance information in the preceding group management information file is neither equal to the maximum value nor smaller by one than the maximum value.

An image recording and reproducing apparatus according to a second aspect of the present invention is an image recording and reproducing apparatus for recording input images of a plurality of channels in such a way as to switch among the plurality of channels during recording and for, every time a single image is recorded in a storage device, storing, in the storage device, index information including the channel of the image, the time when the image is recorded and the address at which the image is stored, the apparatus including:

group management information file creation means for, in recording, grouping recorded images at predetermined time intervals and creating, for each group, a group management information file storing group management information including a start time indicating the time when a first recorded image in a group is recorded, an end time indicating the time when a last recorded image in the group is recorded, an address at which index information about the first recorded image in the group is stored, and channel distance information indicating, for each channel, a group interval from a group including a last recorded image of a channel to the current group; first retrieval means for, in retrieval by specifying a recording time and a channel, performing a primary retrieval process for retrieving a group management information file corresponding to a group including a recorded image of the specified channel and also being closest to the specified time, on the basis of the start times, the end times and the channel distance information corresponding to the specified channel in the respective group management information files; and second retrieval means for performing a secondary retrieval process for retrieving a recorded image of the specified channel, the recorded image having a recording time closest to the specified time, on the basis of the index information of the recorded images in the group corresponding to the group management information file found through the primary retrieval process.

According to the second aspect of the present invention, the first retrieval means may include, for example, means for retrieving, as a reference file, a group management information file having a start time and an end time between which the specified time exists, on the basis of the start times and the end times in the respective group management information files, forward retrieval means for retrieving a group management information file corresponding to a group including a recorded image of the specified channel and having a smallest file interval from the reference file, out of the reference file and the group management information files which have been created earlier than the reference file, on the basis of the channel distance information corresponding to the specified channel in the reference file and in the group management information files which have been created earlier than the reference file, backward retrieval means for retrieving a group management information file corresponding to a group including a recorded image of the specified channel and having a smallest file interval from the reference file, out of the reference file and the group management information files which have been created later than the reference file, on the basis of the channel distance information corresponding to the specified channel in the reference file and in the group management information files which have been created later than the reference file, and means for determining a group management information file corresponding to a group including a recorded image of the specified channel and being closest to the specified time, on the basis of the results of the retrieval by the forward retrieval means and the backward retrieval means.

According to the second aspect of the present invention, the group management information file creation means may include, for example, initial-value setting means for setting an initial value of the channel distance information for each channel in a first group management information file to a predetermined maximum value, and updating means for updating the channel distance information in each of the group management information files. When the channel of a recorded image included in the group corresponding to the current group management information file is a recorded channel, for example, the updating means preferably sets the channel distance information corresponding to the recorded channel to 0, and preferably sets the channel distance information corresponding to the channel other than the recorded channel to the value of the corresponding channel distance information in the group management information file immediately preceding the current group management information file when the value of the corresponding channel distance information in the preceding group management information file is equal to the maximum value or smaller by one than the maximum value, and preferably sets the channel distance information corresponding to the channel other than the recorded channel to a value greater by one than the value of the corresponding channel distance information in the group management information file immediately preceding to the current group management information file, when the value of the corresponding channel distance information in the preceding group management information file is neither equal to the maximum value nor smaller by one than the maximum value.

BRIEF DESCRIPTION OF THE DRAWINGS

FIG. 2 is a schematic diagram illustrating the start times of a plurality of basis files which have been already created, the ch_distance information CD [1] to CD [8] stored in the respective basis files, and the channels of the recorded image data included in the groups corresponding to the respective basis files;

FIG. 9 is a flowchart illustrating the procedure of the process in step S52 (the forward retrieval process) in FIG. 8;

FIG. 13 is a schematic diagram illustrating an exemplary process in step S75 (the second backward retrieval process) in FIG. 10.

DETAILED DESCRIPTION OF THE PREFERRED EMBODIMENTS

Hereinafter, there will be described an embodiment where the present invention is applied to a monitoring system.

Figure 1:
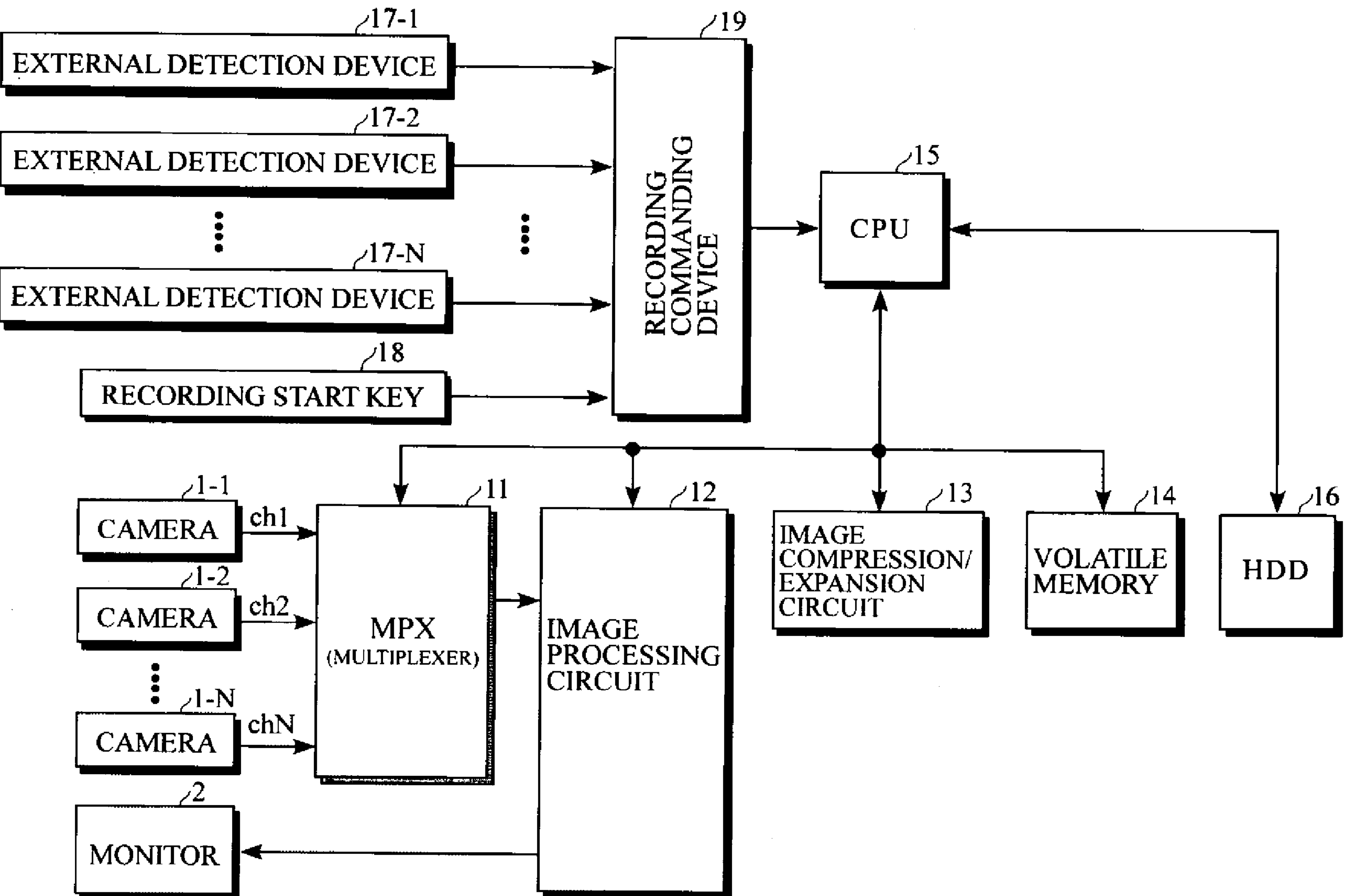
FIG. 1 is a block diagram illustrating the electrical structure of a monitoring system.

FIG. 1 illustrates the electrical structure of the monitoring system.

The monitoring system has the function of recording, into a hard disk, images inputted from a plurality of video cameras and sounds inputted from microphones provided in the respective video cameras, the function of reproducing images and sounds recorded in the hard disk and the function of retrieving images and sounds recorded in the hard disk. Hereinafter, only recording, reproducing and retrieving of images will be described, for ease of description.

In FIG. 1, the monitoring system includes video cameras 1-1, 1-2, . . . , 1-N. The video cameras 1-1, 1-2, . . . , 1-N output image signals having channel numbers of 1 to N. These video cameras will be collectively referred to as video cameras 1. The monitoring system includes a monitor 2.

The monitoring system also includes a multiplexer 11, an image processing circuit 12, an image compression/expansion circuit 13, a volatile memory 14, a CPU 15, a hard disk (HDD) 16, external detection devices 17-1, 17-2, . . . , 17-N in association with the video cameras 1-1, 1-2, . . . , 1-N, a recording start key 18, and a recording commanding device 19.

As recording modes, there are a normal recording mode and an alarm recording mode. The normal recording mode is a mode in which recording is started at the time when the recording start key is pushed or at a recording start time set by a timer. The alarm recording mode is a mode in which recording is performed in consideration of alarm signals from the external detection devices 17-1, 17-2, . . . , 17-N. Also, the alarm recording mode can be set to be a mode in which the changes of input images are continuously monitored for the respective channels and recording is performed in consideration of the changes of images.

Only one of the normal recording mode and the alarm recording mode can be made effective. Also, recording can be performed in the alarm recording mode, when the external detection devices 17-1, 17-2, . . . , 17-N output an alarm signal or a change of an image is detected, during recording in the normal recording mode.

In MENU setting, it is possible to set the following modes (a) and (b), for the normal recording mode.

(a) a mode in which image signals corresponding to the respective channels are recorded in order, at the same recording rate, in a time-division manner (b) a mode in which recording rates are set for the respective channels and images corresponding to the respective channels are recorded in the set recording mode, in a time-division manner In MENU setting, it is possible to set the following modes (c) and (d), for the alarm recording mode.

(c) a mode in which images corresponding to channels for which alarm signals are being outputted are recorded (d) a mode in which, if alarm signals are outputted, images corresponding to channels for which alarm signals are being outputted are preferentially recorded In cases where the aforementioned mode (d) is set, when an alarm signal corresponding to a channel number of 2 is outputted, during recording images for channel numbers of 1 to 4 in order in a time-division manner, for example, the order of recording is changed such that the frequency of recording of images for the channel number 2 is increased, for example, in such an order of ch2, ch1, ch2, ch3, ch2, ch4, ch2, ch1, ch2, ch3, ch2, ch4.

The operations for recording will be described. Image signals corresponding to ch1 to chN inputted from the video cameras 1-1, 1-2, . . . , 1-N are transmitted to the multiplexer 11. The multiplexer 11 synchronizes these un-synchronized image signals for a plurality of channels, divides them in a predetermined order in a time-division manner and then outputs them. Further, the order in which the multiplexer 11 outputs the signals of the channels can be controlled by the CPU 15.

The image signals outputted from the multiplexer 11 are converted into digital image signals by the image processing circuit 12 and, thereafter, the digital image signals are stored in the volatile memory 14. In cases where the image signals stored in the volatile memory 14 are image signals to be recorded, the image signals are compressed by the image compression/expansion circuit 13 and then the compressed image signals are recorded in the HDD 16 through the CPU 15. Further, every time a single image is recorded, index information is created and stored in the HDD 16, wherein the index information is constituted by the channel of this recorded image, the time when it is recorded, the address at which it is recorded, and the like.

The operations for reproducing will be described. When an operating portion which is not shown inputs a command for replaying to the CPU 15, compressed image data is read from the HDD 16 and stored in the volatile memory 14 through the CPU 15. The compressed image data stored in the volatile memory 14 is expanded by the image compression/expansion circuit 13 and, then, the expanded image data is converted into analog image signals by the image processing circuit 12. The image signals created by the image processing circuit 12 are transmitted to the monitor 2 and, then, the monitor 2 displays them. At this time, images for a plurality of channels which are being reproduced can be displayed with a multi-screen method or only images for a specified channel which are being reproduced can be displayed with a single-screen method.

In retrieving, an operator specifies a recording time and a channel which he or she desires to retrieve, images corresponding to the specified time and the specified channel number are read from the HDD 16, and the read images are subjected to the same processing as the processing which is performed for reproducing, which causes the read images to be displayed on the monitor 2.

With reference to FIG. 2, the concept of an embodiment of the present invention will be described.

When images are successively recorded, the recorded images are grouped at predetermined time intervals. Further, when the recording of images is interrupted, the current group is ended at the timing of the interruption. Further, when recording of images is started after the interruption of recording of images, then a new group is created from these recorded images.

In recording, a file referred to as a basis file (a group management information file) is created for each group, in the HDD 16. The basis files are provided with respective serial numbers (basis numbers), in the order of creation.

The basis information, which is written in each basis file, is constituted by the following information.

Start Time: the time when the first image data in each group is recorded (year, month, day and time)

End Time: the time when the last image data in each group is recorded (year, month, day and time)

Index Address: the address at which the index information about the first recorded image in each group is written, in an index-information storage area in the HDD Data Address: the address at which the first recorded image in each group is written, in an image-data storage area in the HDD CD[1] to CD[N] (ch distance information): information indicative of the group interval between the group including the last recorded image of the channel indicated by [n] and the current group FIG. 2 illustrates the start times of a plurality of basis files which have been already created, the ch_distance information CD [1] to CD [8] stored in the respective basis files, and the channels of the recorded image data included in the groups corresponding to the respective basis files.

The invention of the present application is characterized in that the processing time required for retrieving images by specifying a recording time and a channel is reduced, by utilizing the start times, the end times and the ch_distance information stored in the respective basis files.

There will be described the method for setting ch_distance information in each basis unit.

In the first basis file, the ch_distance information is set to an initial value "0xFF" (=255). However, in the basis file, the ch_distance information corresponding to channels for which image data has been recorded is reset to "0x00".

Further, if the basis file is updated to the next basis file, the ch_distance information which has had a value of "0xFE" or "0xFF" just before the updating, out of the respective ch_distance information, is kept at the same value, while the values of the ch_distance information other than the ch_distance information which has had a value of "0xFE" or "0xFF" just before the updating are incremented by one, in the updated basis file. However, in the updated basis file, the ch_distance information corresponding to channels for which image data has been recorded is reset to "0x00". Accordingly, the maximum value MAX of ch_distance information is "0xFF", in this example.

In a process for retrieving an image by specifying a recording time and a channel, at first, a basis file closest to the specified time (a reference basis file) is found. By performing forward retrieval (retrieval in a temporally reversing manner) with respect to the reference basis file and backward retrieval (retrieval in a temporally proceeding manner) with respect to the reference basis file, a basis file closest to the specified time (a target basis file) is determined, out of the basis files corresponding to the groups including recorded images of the specified channel. Then, on the basis of the index information of the recorded images in the group corresponding to the determined target basis file, a recorded image, the recording time of which is closest to the specified time, is retrieved, out of the recorded images of the specified channel.

The forward retrieval will be described.

(F1) If the ch_distance information corresponding to the specified channel in the reference basis file is "00", the reference basis file becomes a target basis file for the forward retrieval.

(F2) If the ch_distance information corresponding to the specified channel in the reference basis file is "FF", there is no target basis file before the reference basis file.

(F3) If the ch_distance information corresponding to the specified channel in the reference basis file is "01" to "FD", a basis file at the position backward by the value of the ch_distance information becomes the target basis file for the forward retrieval.

(F4) If the ch_distance information corresponding to the specified channel in the reference basis file is "FE", a basis file at the position backward by the value of the ch_distance information from the reference basis file is set as a focus basis file. If the ch_distance information corresponding to the specified channel in the focus basis file is "00", the focus basis file becomes a target basis file for the forward retrieval. If the ch_distance information corresponding to the specified channel in the focus basis file is not "00", a basis file at the position backward by the value of the ch_distance information from the focus basis file is set as a focus basis file. Then, the same processing is performed.

The backward retrieval will be described.

(R1) If the ch_distance information corresponding to the specified channel in the reference basis file is "00", the reference basis file becomes a target basis file for the backward retrieval.

(R2) In the case where the ch_distance information corresponding to the specified channel in the reference basis file is "FF", (R2-1) If the ch_distance information corresponding to the specified channel in the reference basis file is "FF", a basis file at the position forward by "FE" from the reference basis file is set as a focus basis file. Then, if the ch_distance information corresponding to the specified channel in the focus basis file is "FF", the focus basis file is updated in the same way. In this way, a focus basis file including ch_distance information different from "FF" corresponding to the specified channel is found.

(R2-2) After a focus basis file including ch_distance information different from "FF" corresponding to the specified channel is found, a basis file including ch_distance information of "00" corresponding to the specified channel is found, out of the basis files forward of the focus basis file, according to the method described in the aforementioned (F3) and (F4). Then, the found basis file is set as a focus basis file. If the ch_distance information corresponding to the specified channel in the basis file immediately preceding to the focus basis file is "FF", the focus basis file becomes a target basis file for the backward retrieval.

(R2-3) If the ch_distance information corresponding to the specified channel in the basis file immediately preceding to the focus basis file is not "FF", the basis file immediately preceding to the focus basis file is set as a focus basis file and, then, the same processing as the aforementioned (R2-2) is performed.

(R3) In the case where the ch_distance information corresponding to the specified channel in the reference basis file is neither "0" nor "FF", (R3-1) If the ch_distance information corresponding to the specified channel in the reference basis file is neither "0" nor "FF", a basis file at the position forward by "FE" from the reference basis file is set as a focus basis file. Then, if the ch_distance information corresponding to the specified channel in the focus basis file is "FE", the focus basis file is updated in the same way. In this way, a focus basis file including ch_distance information different from "FE" corresponding to the specified channel is found.

(R3-2) After a focus basis file including ch_distance information different from "FE" corresponding to the specified channel is found, a basis file including ch_distance information of "00" corresponding to the specified channel is found, out of the basis files forward of the focus basis file, according to the method described in the aforementioned (F3) and (F4). Then, the found basis file is set as a focus basis file.

(R3-3) If the ch_distance information corresponding to the specified channel in the basis file immediately preceding to the focus basis file is "FE") the focus basis file becomes a target basis file for the backward retrieval. If the ch_distance information corresponding to the specified channel in the basis file immediately preceding to the focus basis file is not "FE", it is determined whether or not the value of the ch_distance information decremented by the ch_distance information in the reference basis file agrees with the distance from the reference basis file to the basis file. If they agree with each other, the focus basis file becomes a target basis file for the backward retrieval. If they do not agree with each other, a basis file at the position backward from the basis file immediately preceding to the focus basis file by the value of the ch_distance information corresponding to the specified channel in the preceding basis file is set as a focus basis file. Then, the same processing as the aforementioned (R3-3) is performed.

Figure 3:
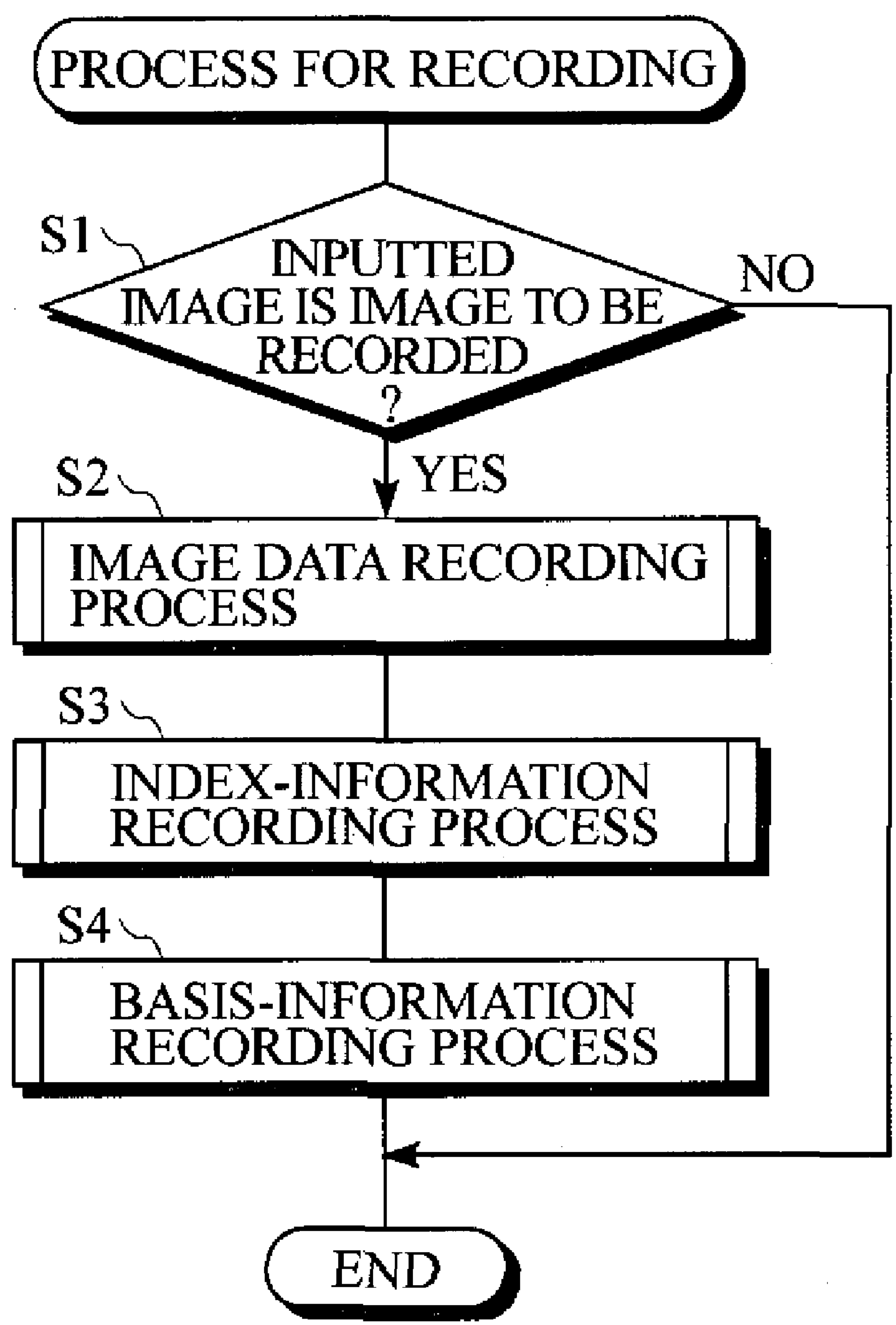
FIG. 3 is a flowchart illustrating the procedure of a recording process which is performed for recording.

FIG. 3 illustrates the procedure of a recording process which is performed for recording.

The recording process is performed every time an image is inputted from the MPX 11.

At first, it is determined whether or not an image inputted from the MPX 11 is an image to be recorded (step S1). The determination as to whether or not the inputted image is an image to be recorded is performed, on the basis of the order of recording of channels, the recording rates for the respective channels and the like in the current recording mode. If the inputted image is not an image to be recorded, the current recording process is ended.

If the inputted image is an image to be recorded, a process for recording this image data in the HDD 16 (an image data recording process) is performed (step S2). Further, a process for recording index information about this image data in the HDD 16 (an index-information recording process) is performed (step S3). The index information is constituted by information about the time when this image data is recorded, the channel of this image data and the address at which this image data is stored.

Thereafter, a process for recording basis information (group management information) in the HDD 16 (basis-information recording process) is performed (step S4). Then, the current recording processing is ended.

Figure 4:
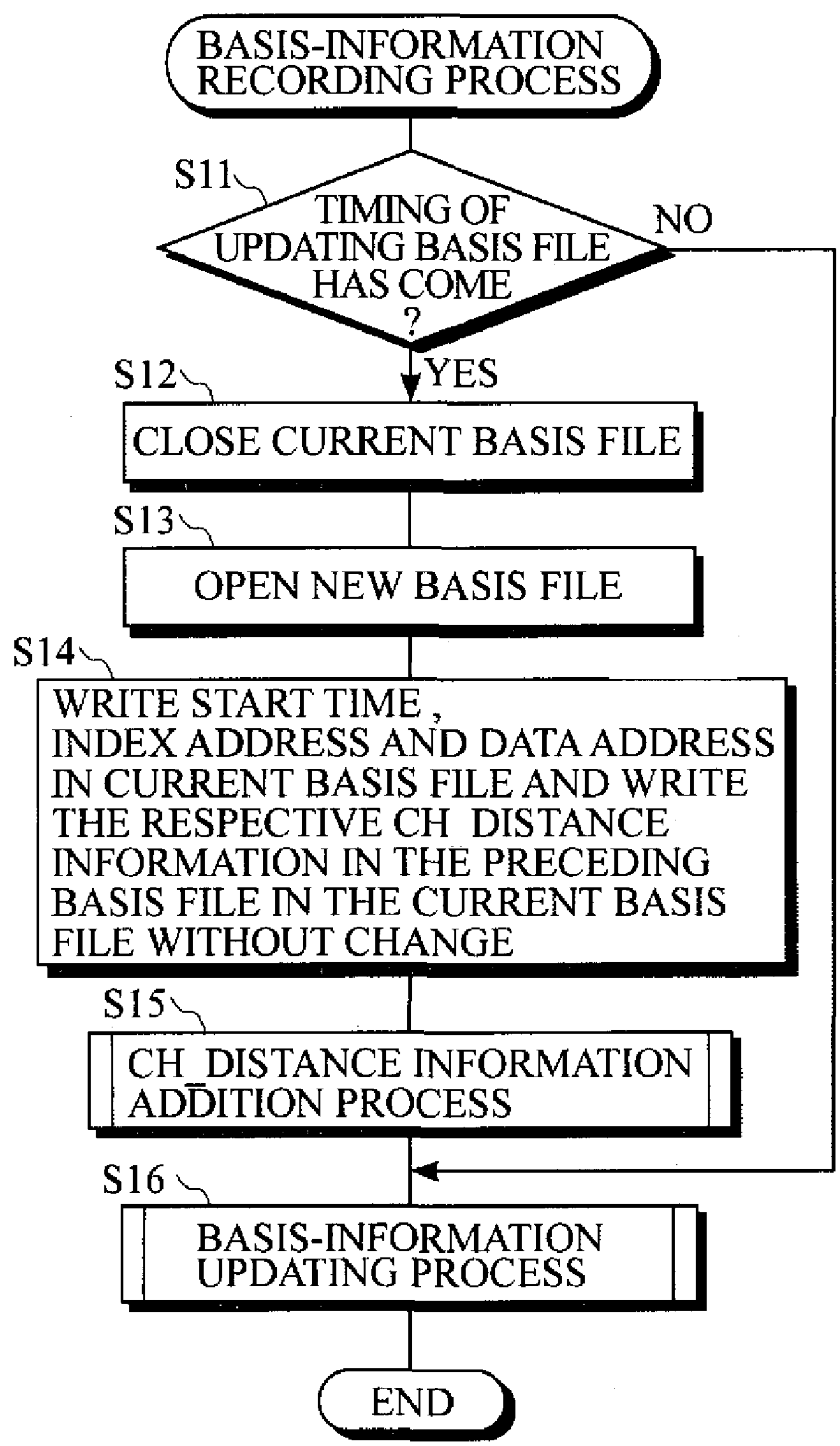
FIG. 4 is a flowchart illustrating the procedure of the process in step S4 (the basis-information recording process) in FIG. 3.

FIG. 4 illustrates the procedure of the process in step S4 (the basis-information recording process) in FIG. 3.

At first, it is determined whether or not the timing of updating a basis file has come (step S11). Namely, it is determined whether or not the timing of updating a group of recorded images has come. If the timing of updating a basis file has not come, the process proceeds to step S16.

If the timing of updating a basis file has come, the current basis file is closed (step S12) and, then, a new basis file is opened and set to be a current basis file (step S13). Then, a start time, an index address and a data address are written in the current basis file and, also, the respective ch_distance information (CD[1] to CD[n]) in the preceding basis file (the basis file closed in step S12) are written therein without change (step S14).

The start time is when the image data inputted this time around is recorded. Further, the index address is the address to which the index information about the image data inputted this time around is written, in the index-information storage area in the HDD. Further, the data address is the address to which the image inputted this time around is written, in the image-data storage area in the HDD.

Next, a ch_distance information addition process is performed (step S15) and, thereafter, the process proceeds to step S16. In the ch_distance information addition process, the contents of ch_distance information having contents different from MAX and (MAX-1), out of the respective ch_distance information, are incremented by one. The ch_distance information addition process will be described in more detail, later.

In step S16, a process for updating the basis information in the current basis file (basis-information updating process) is performed. The basis-information updating process will be described in more detail, later. Then, the current basis information recording process ends.

Figure 5:
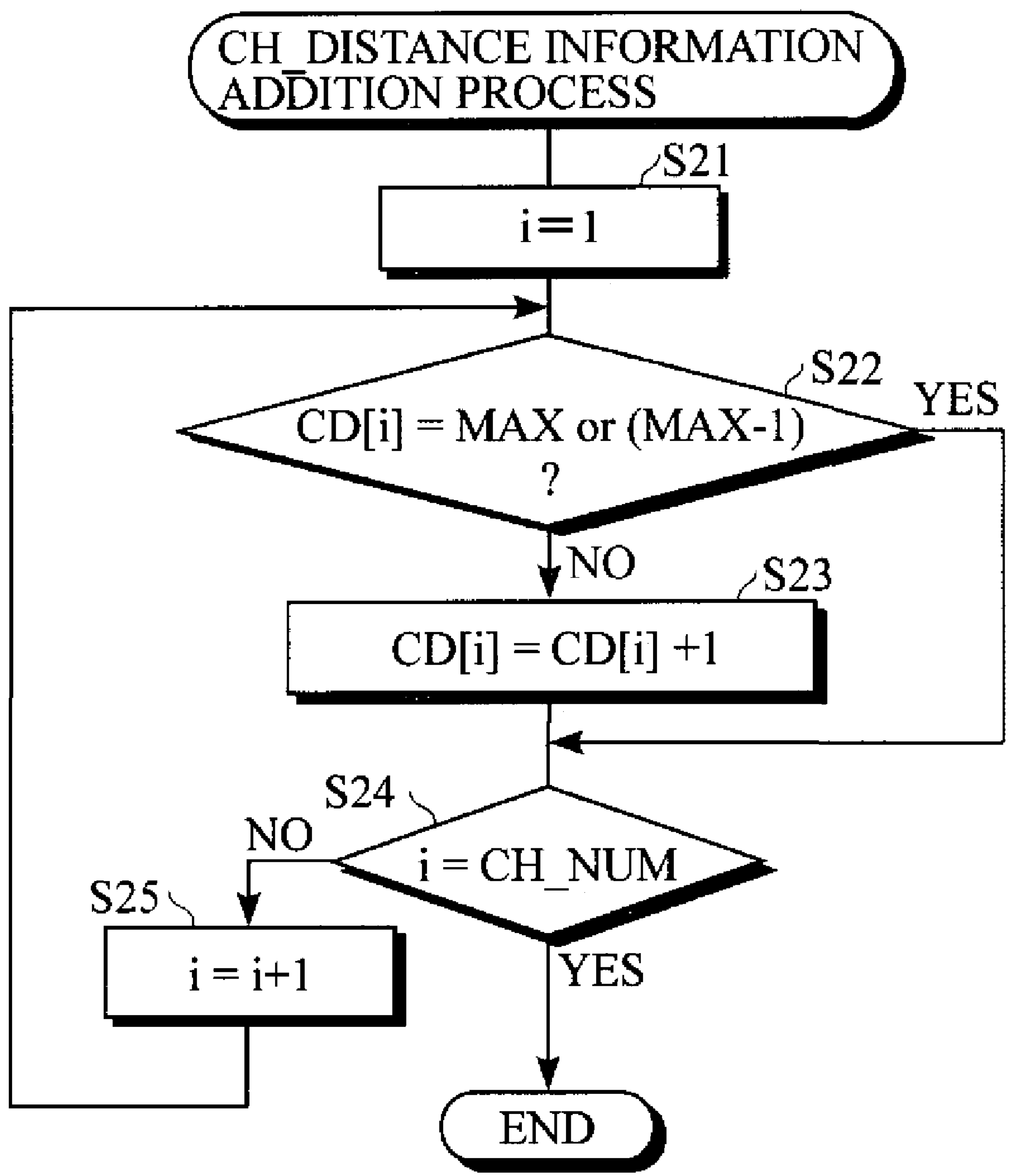
FIG. 5 is a flowchart illustrating the procedure of the process in step S15 (the ch_distance information addition process) in FIG. 4.

FIG. 5 illustrates the procedure of the processing in step S15 (the ch_distance information addition process) in FIG. 4.

At first, a variable value i is set to 1 (step S21). Next, it is determined whether or not the ch_distance information CD [i] is MAX or (MAX-1) (step S22). If CD[i] is neither MAX nor (MAX-1), the ch_distance information CD[i] is incremented by one (step S23). Then, the process proceeds to step S24.

If it is determined in step S22 that ch_distance information CD[i] is MAX or (MAX-1), the process proceeds to step S24, without updating the ch_distance information CD[i].

In step S24, it is determined whether or not i equals to the number of channels CH_NUM. If i does not equal to CH-NUM, i is incremented by one (step S25) and, thereafter, the process returns to step S22.

When the processes from step 22 have been performed on the ch_distance information about all the channels, step S24 results in a determination that i equals to CH_NUM and, therefore, the current ch_distance information addition process is ended.

Figure 6:
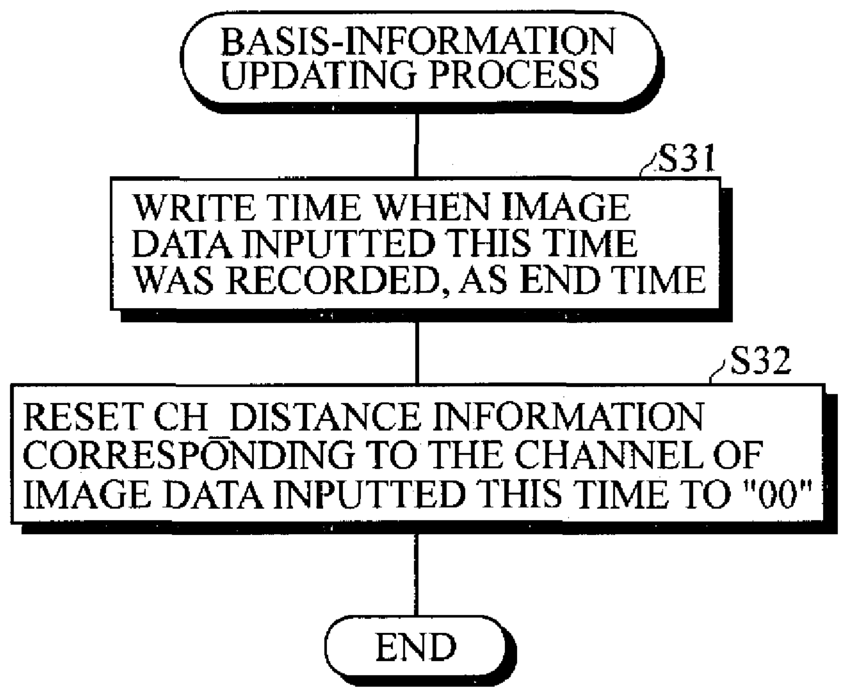
FIG. 6 is a flowchart illustrating the procedure of the process in step S16 (the basis-information updating process) in FIG. 4.

FIG. 6 illustrates the procedure of the process in step S16 (the basis-information updating process) in FIG. 4.

At first, the time when the image data inputted this time around is recorded is written as the end time of the current basis file (step S31). Further, if an end time has been already written in the current basis file at this time, the end time of the current basis file is updated to the time when this image data is recorded.

Next, the ch_distance information corresponding to the channel of the image data inputted this time around is reset to "00" (step S32). Namely, when the channel of the image data inputted this time around is rec_ch, CD[rec_ch] is set to 0. Then, the current basis-information updating process ends.

Figure 7:
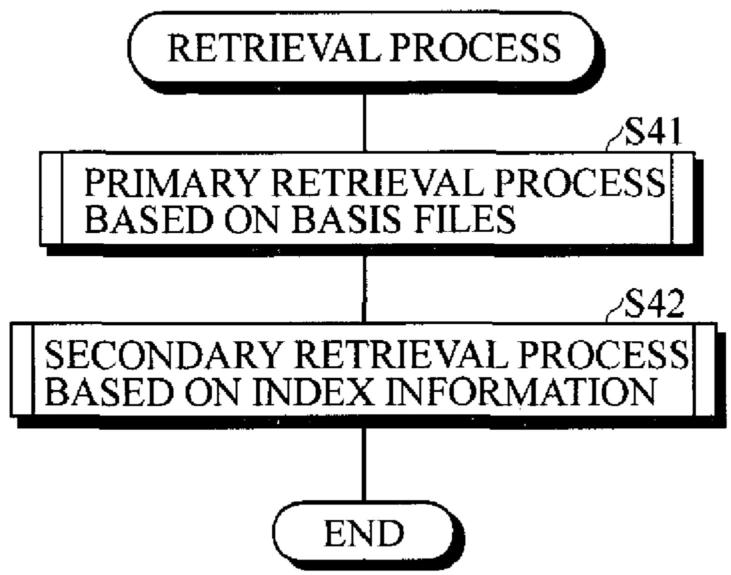
FIG. 7 is a flowchart illustrating the procedure of a retrieval process which is performed for retrieval.

FIG. 7 illustrates the procedure of a retrieval process which is performed for retrieval.

At the start of retrieval, a recording time (a specified time: year, month, day, hour, minute and second) and a channel (specified channel) which are desired to be retrieved are inputted.

In the retrieval process, at first, a primary retrieval process is performed on the basis of basis files (step S41). In the primary retrieval process, a basis file closest to the specified time is retrieved, out of basis files corresponding to groups including recorded images of the specified channel. The primary retrieval process will be described in more detail, later.

After the primary retrieval process is ended, a secondary retrieval process based on index information is performed (step S42). Namely, on the basis of the index information about the basis file retrieved through the primary retrieval process, image data closest to the specified time is retrieved, out of image data of the specified channel. More specifically, on the basis of the index address, the start time and the end time which are written in the basis file retrieved through the primary retrieval process, the index information about the respective images included in the group corresponding to this basis file is identified and, on the basis of the identified index information, image data closest to the specified time is retrieved, out of image data of the specified channel. The image data retrieved through the secondary retrieval process is displayed on the monitor.

Figure 8:
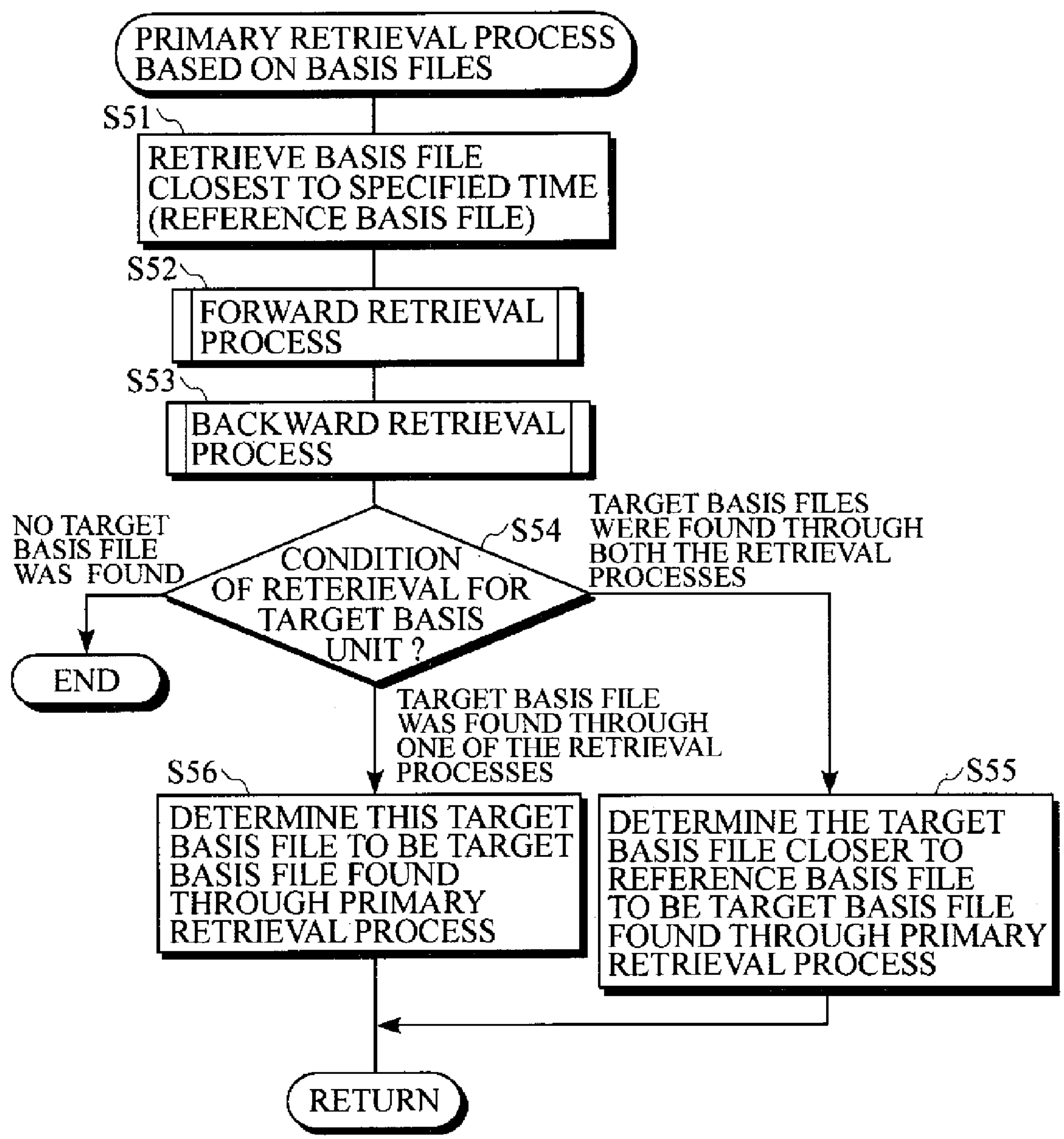
FIG. 8 is a flowchart illustrating the procedure of the process in step S41 (the primary retrieval process) in FIG. 7.

FIG. 8 illustrates the procedure of the process in step S41 (the primary retrieval process) in FIG. 7.

At first, a basis file closest to the specified time is retrieved, on the basis of the start times and the end times of the respective basis files (step S51). Namely, a basis file having a start time and an end time between which the specified time exists is retrieved. The retrieved basis file will be referred to as a reference basis file.

Next, a process for retrieving a basis file corresponding to a group including recorded images of the specified channel and having a smallest file interval from the reference basis file (a target basis file for forward retrieval), out of the reference basis file retrieved in step S51 and the basis files created earlier than the reference basis file (a forward retrieval process), is performed (step S52).

After the forward retrieval process is ended, a process for retrieving a basis file corresponding to a group including recorded images of the specified channel and having a smallest file interval from the reference basis file (a target basis file for backward retrieval), out of the reference basis file retrieved in step S51 and the basis files created later than the reference basis file (a backward retrieval process), is performed (step S53).

After the backward retrieval process is ended, it is determined whether target basis files could be found through both the forward retrieval process and the backward retrieval process, a target basis file could be found through one of the retrieval processes, or no target basis file could be found through any of the retrieval processes (step S54).

If target basis files could be found through both the retrieval processes, the file closer to the specified time, out of both the target basis files, is set to be a target basis file found through the primary retrieval (step S55). More specifically, assuming that the time interval between the end time of the target basis file found through the forward retrieval process and the specified time is delta f and the time interval between the specified time and the start time of the target basis file found through the backward retrieval process is delta r, if delta f is smaller than delta r, the target basis file found through the forward retrieval process is set to be a target basis file found through the primary retrieval, but if delta r is smaller than delta f, the target basis file found through the backward retrieval process is set to be a target basis file found through the primary retrieval. Then, the process proceeds to step S42 in FIG. 7.

Also, in cases where accuracy is required when target basis files could be found through both the retrieval processes, secondary retrieval can be performed on the basis of the target basis file found through the forward retrieval process and, also, secondary retrieval can be performed on the basis of the target basis file found through the backward retrieval process and, out of the recorded images found through both the secondary retrievals, the recorded image having a recording time closer to the specified time can be set to be a recorded image finally resulted from the retrieval.

If a target basis file could be found through one of the retrieval processes, this target basis file is set to be a target basis file found through the primary retrieval (step S56). Then, the process proceeds to step S42 in FIG. 7.

If no target basis file could be found through any of the retrieval processes, it is determined that there is no recorded data to be retrieved, and the current retrieval process is ended.

FIG. 9 illustrates the procedure of the process in step S52 (the forward retrieval process) in FIG. 8.

A reference basis file (a basis file closest to the specified time) is set to be a focus basis file (step S61). The ch_distance information corresponding to the specified channel in the focus basis file is acquired and set as ch_dis (step S62).

Then, it is determined whether the value of ch_dis is 0, MAX or other values (step S63).

If the value of ch_dis is 0, it is determined that the group corresponding to the focus basis file includes an image of the specified channel, and the focus basis file is identified as a target basis file found through the forward retrieval (step S64). Then, the forward retrieval process is ended.

If the value of ch_dis is MAX, it is determined that the groups corresponding to the focus basis file and the basis files forward of the focus basis file (temporally backward of the focus basis file) include no image of the specified channel, and the fact that no target file could be found through the forward retrieval is stored (step S65). Then, the forward retrieval process is ended.

If it is determined that the value of ch_dis is neither 0 nor MAX, a basis file having a basis number smaller than the basis number of the focus basis file by the value of ch_dis is set to be a focus basis file (step S66). Namely, the focus basis file is updated. Then, the process returns to step S62 for performing the processes from step S62, again.

Figure 10:
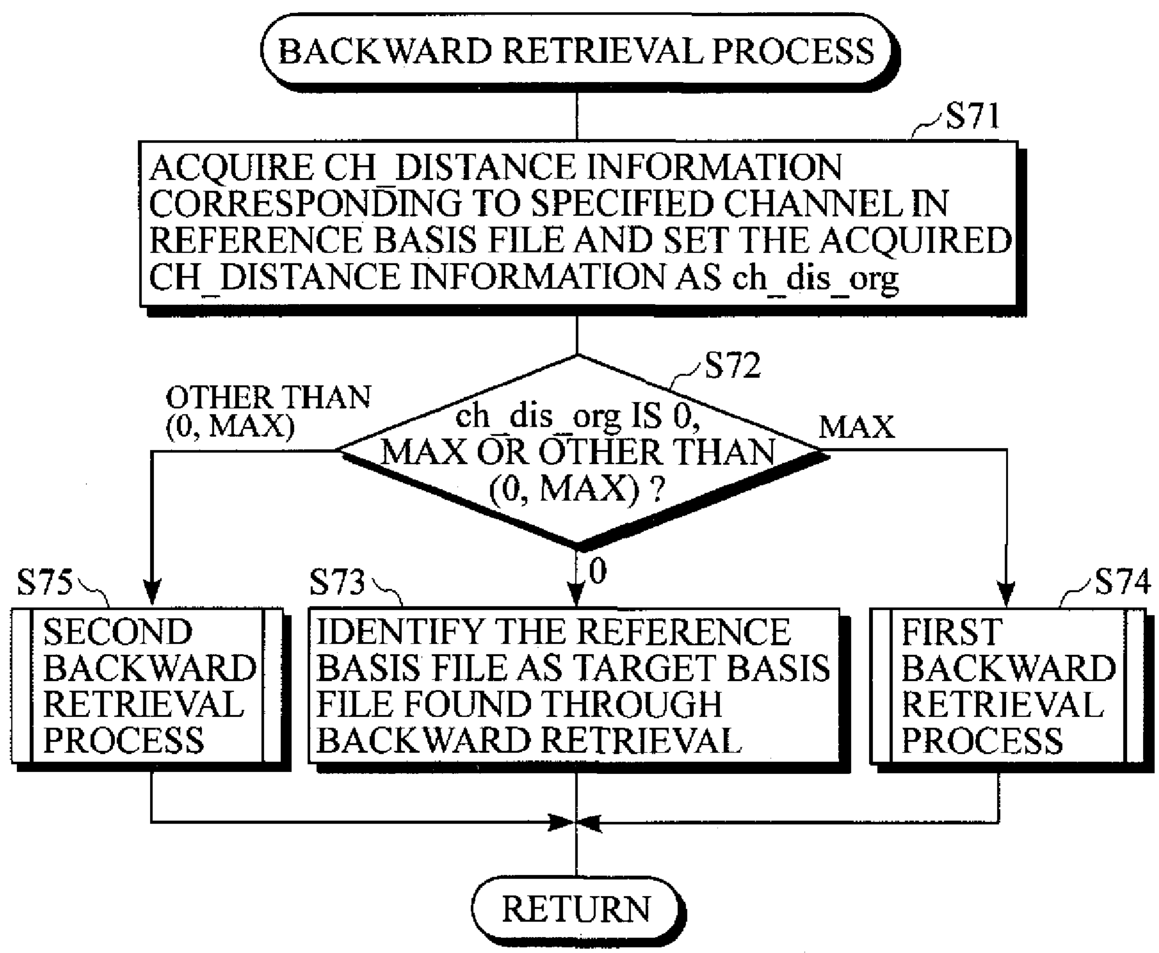
FIG. 10 is a flowchart illustrating the procedure of the process in step S53 (the backward retrieval process) in FIG. 8.

FIG. 10 illustrates the procedure of the process in step S53 (the backward retrieval process) in FIG. 8.

The ch_distance information corresponding to the specified channel in the reference basis file (the basis file closest to the specified time) is acquired, and the acquired ch_distance information is set as ch_dis_org (step S71).

Then, it is determined whether the value of ch_dis_org is 0, MAX or other values (step S72).

If the value of ch_dis_org is 0, the reference basis file is identified as a target basis file found through the backward retrieval (step S73) and, then, the backward retrieval process is ended.

If it is determined that the value of ch_dis_org is MAX, a first backward retrieval process is performed (step S74) and, then, the backward retrieval process is ended.

If it is determined that the value of ch_dis_org is other than 0 and MAX, a second backward retrieval process is performed (step S75) and then the backward retrieval process is ended.

Figure 11:
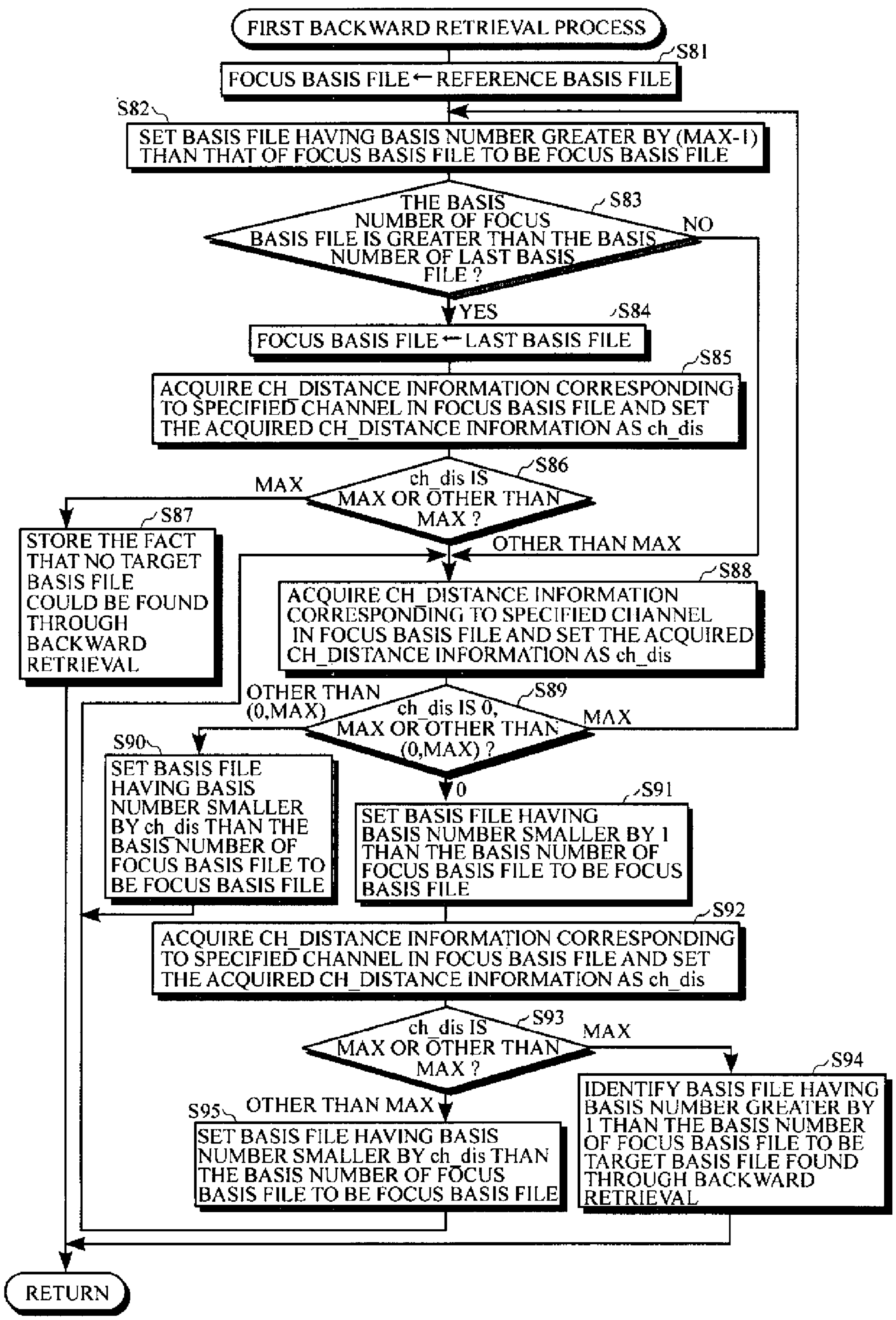
FIG. 11 is a flowchart illustrating the procedure of the process in step S74 (the first backward retrieval process) in FIG. 10.

FIG. 11 illustrates the procedure of the process in step S74 (the first backward retrieval process) in FIG. 10.

At first, the reference basis file is set to be a focus basis file (step S81). A basis file having a basis number greater by (MAX-1) than the basis number of the focus basis file is set to be a focus basis file (step S82). Namely, the focus basis file is updated.

It is determined whether or not the basis number of the focus basis file is greater than the basis number of the last basis file, out of the basis files which have been already created (step S83).

If the basis number of the focus basis file is equal to or less than the basis number of the last basis file out of the already-created basis files, it is determined that there is a basis file corresponding to a focus basis file, and the process proceeds to step S88.

If the basis number of the focus basis file is greater than the basis number of the last basis file out of the already-created basis files, the last basis file is set to be a focus basis file (step S84), since there is no basis file corresponding to a focus basis file. Then, the ch_distance information corresponding to the specified channel in the focus basis file is acquired and set as ch_dis (step S85).

It is determined whether the value of ch_dis is MAX or other values (step S86).

If the value of ch_dis is MAX, it is determined that the groups corresponding to the basis files from the reference basis file to the last basis file include no image of the specified channel, the fact that no target basis file could be found through the backward retrieval is stored (step S87) and, then, the backward retrieval process is ended. If it is determined in step S86 that the value of ch_dis is other than MAX, the process proceeds to step S88.

In step S88, the ch_distance information corresponding to the specified channel in the focus basis file is acquired, and the acquired ch_distance information is set as ch_dis. Then, it is determined whether the value of ch_dis is 0, MAX or other values (step S89).

If the value of ch_dis is MAX, it is determined that the groups corresponding to the basis files from the reference basis file to the focus basis file include no image of the specified channel, and the process returns to step S82 in order to perform retrieval for the later basis files.

If it is determined in step S89 that the value of ch_dis is other than (0, MAX), a basis file having a basis number smaller by the value of ch_dis than the basis number of the focus basis file is set to be a focus basis file (step S90). Then, the process returns to step S88.

If it is determined in step S89 that the value of ch_dis is 0, a basis file having a basis number smaller by 1 than the basis number of the focus basis file is set to be a focus basis file (step S91).

Then, the ch_distance information corresponding to the specified channel in the focus basis file is acquired and set as ch_dis (step S92). Then, it is determined whether the value of ch_dis is MAX or other values (step S93).

If the value of ch_dis is MAX, a basis file having a basis number greater by 1 than the basis number of the focus basis file is identified as a basis file found through the backward retrieval (step S94) and, then, the backward retrieval is ended.

If the value of ch_dis is other than MAX, a basis file having a basis number smaller by the value of ch_dis than the basis number of the focus basis file is set to be a focus basis file (step S95). Then, the process returns to step S88.

Figure 12:
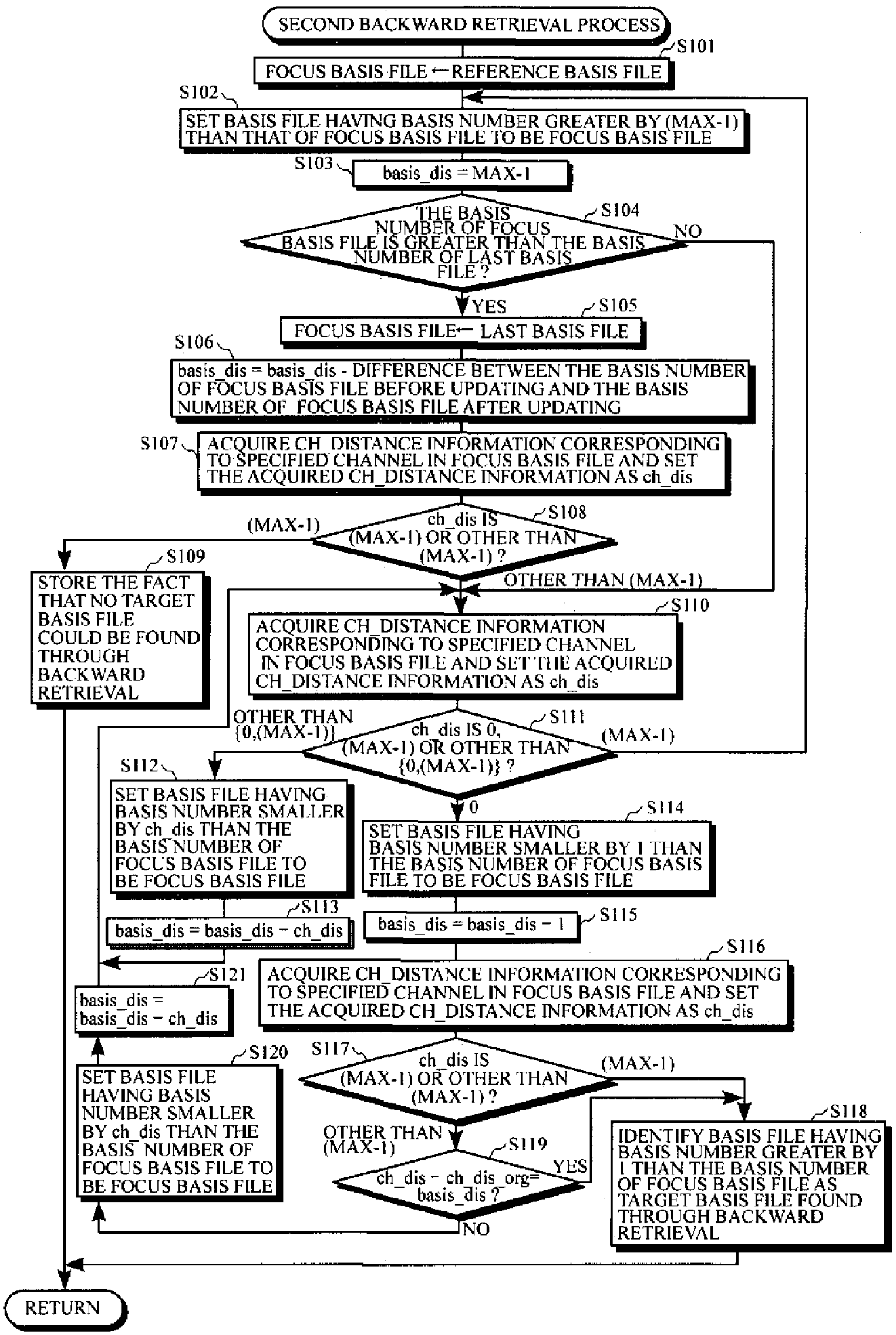
FIG. 12 is a flowchart illustrating the procedure of the process in step S75 (the second backward retrieval process) in FIG. 10.

FIG. 12 illustrates the procedure of the process in step S75 (the second backward retrieval process) in FIG. 10.

At first, the reference basis file is set to be a focus basis file (step S101). A basis file having a basis number greater by (MAX-1) than the basis number of the focus basis file is set to be a focus basis file (step S102). Namely, the focus basis file is updated.

Further, a variable value basis_dis indicative of the distance from the reference basis file to the focus basis file is set to (MAX-1) (step S103). In this example, MAX is "0xFF" and, therefore, (MAX-1) is "0xFE" and basis_dis is "0xFE".

Then, it is determined whether or not the basis number of the focus basis file is greater than the basis number of the last basis file out of the basis files which have been already created (step S104).

If the basis number of the focus basis file is equal to or less than the basis number of the last basis file out of the already-created basis files, it is determined that there is a basis file corresponding to a focus basis file, and the process proceeds to step S110.

If the basis number of the focus basis file is greater than the basis number of the last basis file out of the already-created basis files, the last basis file is set to be a focus basis file (step S105). Namely, the focus basis file is updated. Further, assuming that the difference between the basis number of the focus basis file before the updating and the basis number of the focus basis file after the updating is delta, the value of basis_dis is updated to the value of the current basis_dis decremented by delta (step S106).

The ch_distance information corresponding to the specified channel in the focus basis file is acquired and set as ch_dis (step S107). Then, it is determined whether the value of ch_dis is (MAX-1) or other values (step S108).

If the value of ch_dis is (MAX-1), it is determined that the groups corresponding to the basis files from the reference basis file to the last basis file include no image of the specified channel, the fact that no target basis file could be found through the backward retrieval is stored (step S109) and, then, the backward retrieval process is ended. If the value of ch_dis is other than (MAX-1), the process proceeds to step S110.

In step S110, the ch_distance information corresponding to the specified channel in the focus basis file is acquired, and the acquired ch_distance information is set as ch_dis. Then, it is determined whether the value of ch_dis is 0, (MAX-1) or other values (step S111).

If the value of ch_dis is (MAX-1), it is determined that the groups corresponding to the basis files from the reference basis file to the focus basis file include no image of the specified channel, and the process returns to step S102 in order to perform retrieval for the later basis files.

If it is determined in step S111 that the value of ch_dis is other than {0, (MAX-1)}, a basis file having a basis number smaller by the value of ch_dis than the basis number of the focus basis file is set to be a focus basis file (step S112). Further, the value of basis_dis is updated to the value of the current basis_dis decremented by ch_dis (step S113). Then, the process returns to step S110.

If it is determined in step S111 that the value of ch_dis is 0, a basis file having a basis number smaller by 1 than the basis number of the focus basis file is set to be a focus basis file (step S114). Further, the value of basis_dis is updated to the value of the current basis_dis decremented by 1 (step S115).

Then, the ch_distance information corresponding to the specified channel in the focus basis file is acquired and set as ch_dis (step S116). Then, it is determined whether the value of ch_dis is (MAX-1) or other values (step S117).

If the value of ch_dis is (MAX-1), a basis file having a basis number greater by 1 than the basis number of the focus basis file is identified as a basis file found through the backward retrieval (step S118) and, then, the backward retrieval is ended.

If the value of ch_dis is other than (MAX-1), it is determined whether or not the value of (ch_dis-ch_dis_org) agrees with the value of basis_dis (step S119). If the value of (ch_dis-ch_dis_org) agrees with the value of basis_dis, a basis file having a basis number greater by 1 than the basis number of the focus basis file is identified as a basis file found through the backward retrieval (step S118) and, then, the backward retrieval is ended.

If it is determined in step S119 that the value of (ch_dis-ch_dis_org) does not agree with the value of basis_dis, a basis file having a basis number smaller by the value of ch_dis than the basis number of the focus basis file is set as a focus basis file (step S120). Further, the value of basis_dis is updated to the value of the current basis_dis decremented by ch_dis (step S121). Then, the process returns to step S110.

With reference to FIG. 13, the second backward retrieval process will be described in detail.

The rows of numbers in FIG. 13 indicate the ch_distance information corresponding to the specified channel stored in the respective basis files. In this example, the reference basis file is designated as basis [m] (m is the basis number). In this example, the ch_distance information corresponding to the specified channel in the reference basis file is "5" and, therefore, ch_dis_org equals to 5.

In step S102 in FIG. 12, as illustrated in (a) part in FIG. 13, the basis number is forwarded by (MAX-1) from the reference basis file (the focus basis file) and, therefore, basis [m+"0xFE"] becomes a focus basis file. Further, in step S103, basis_dis is "0xFE".

If the basis number (m+"0xFE") of the focus basis file is equal to or less than the basis number of the last basis file out of the already-created basis files, the process proceeds to step S110. In step S110, the ch_distance information corresponding to the specified channel in the focus basis file (basis

[m+“0xFE”]) is acquired and the acquired ch_distance information is set as ch_dis. In this example, ch_dis is “0xF9”.

In step S111, it is determined whether the value of ch_dis is 0, (MAX-1) or other values. In this example, the value of ch_dis is a value other than 0 and (MAX-1) and, therefore, the process proceeds to step S112 where the basis number is backed by the value of ch_dis (=“0xF9”) from the focus basis file, as illustrated in (b) part in FIG. 13. In this example, basis [m+“0xFE”−“0xF9”]=basis [m+“5”] becomes a focus basis file. Further, in step S113, the value of basis_dis is set to “0xFE”−“0xF9”=5. Then, the process proceeds to step S110.

In step S110, the ch_distance information corresponding to the specified channel in the focus basis file (basis [m+“5”]) is acquired and the acquired ch_distance information is set as ch_dis. In this example, ch_dis is “0”.

In step S111, it is determined whether the value of ch_dis is 0, (MAX-1) or other values. In this example, the value of ch_dis is 0 and, therefore, the process proceeds to step S114 where the basis number is backed by 1 from the focus basis file, as illustrated in (c) part in FIG. 13. Namely, basis [m+“4”] becomes a focus basis file. In step S115, the value of basis_dis is set to “5”−“1”=4.

In step S116, the ch_distance information corresponding to the specified channel in the focus basis file (basis [m+“4”]) is acquired, and the acquired ch_distance information is set as ch_dis. In this example, ch_dis is “1”. The value of ch_dis is other than (MAX-1) and, therefore, the process proceeds to step S119 where it is determined whether or not (ch_dis-ch_dis_org) agrees with basis_dis. In this case, the value of (ch_dis-ch_dis_org) is 1−5=−4 while the value of basis_dis is 4 and, therefore, (ch_dis-ch_dis_org) does not agree with basis_dis.

Accordingly, the process proceeds to step S120 where the basis number is backed by the value of ch_dis (=“1”) from the focus basis file, as illustrated in (d) part in FIG. 13. In this example, basis [m+“4”−“1”]=basis [m+“3”] becomes a focus basis file. Further, in step S121, the value of basis_dis is set to “4”−“1”=3. Then, the process returns to step S110.

In step S110, the ch_distance information corresponding to the specified channel in the focus basis file (basis [m+“3”]) is acquired, and the acquired ch_distance information is set as ch_dis. In this example, ch_dis is “0”.

In step S111, it is determined whether the value of ch_dis is 0, (MAX-1) or other values. In this example, the value of ch_dis is 0 and, therefore, the process proceeds to step S114 where the basis number is backed by 1 from the focus basis file, as illustrated in (e) part in FIG. 13. Namely, basis [m+“2”] becomes a focus basis file. In step S115, the value of basis_dis is set to “3”−“1”=2.

In step S116, the ch_distance information corresponding to the specified channel in the focus basis file (basis [m+“2”]) is acquired, and the acquired ch_distance information is set as ch_dis. In this example, ch_dis is “7”. The value of ch_dis is other than (MAX-1) and, therefore, the process proceeds to step S119 where it is determined whether or not (ch_dis-ch_dis_org) agrees with basis_dis. In this case, (ch_dis-ch_dis_org) is 7−5=2 and basis_dis is 2 and, therefore, (ch_dis-ch_dis_org) agrees with basis_dis.

Accordingly, the process proceeds to step S118 where a file having a basis number greater by 1 than the focus basis file is identified as a basis file found through the backward retrieval, as illustrated in (f) part in FIG. 13. Namely, the basis file (basis [m+“3”]) is identified as a target basis file found through the backward retrieval.

Further, ch_distance information is constituted by information about numerical values in the range of 0 to a maximum value (“0xFF” in this example). However, ch_distance information can be constituted by a flag indicative of whether or not images of the corresponding channel have not been recorded yet (hereinafter, referred to as an un-recording flag), and information about numerical values in the range of 0 to a predetermined maximum value which is used after the un-recording flag is changed to a value indicating that an image of the corresponding channel has been recorded. In this case, the initial value of the un-recording flag which is a constituent of the ch_distance information is set to 1 (a set state) and, when an image of the corresponding channel has been recorded, the un-recording flag is set to 0 (a reset state). Further, the numerical-value information which is a constituent of the ch_distance information is set to 0 at the timing when the un-recording flag becomes 0. Namely, the determination as to whether or not the ch_distance information has a maximum value in the aforementioned example is performed on the basis of whether or not the un-recording flag is set. Further, (the maximum value −1) in the aforementioned example is maximum value of numerical-value information.

What is claimed is:

1. An image recording and reproducing apparatus for recording input images of a plurality of channels in such a way as to switch among the plurality of channels during recording and for, every time a single image is recorded in a storage device, storing, in the storage device, index information including the channel of the image, the time when the image is recorded and the address at which the image is stored, the apparatus comprising:

- a group management information file creation circuit for, in recording, grouping recorded images at predetermined time intervals and creating, for each group, a group management information file storing group management information including a start time indicating the time when a first recorded image in a group is recorded, an end time indicating the time when a last recorded image in the group is recorded, an address at which index information about the first recorded image in the group is stored, and channel distance information indicating, for each channel, a group interval from a group including a last recorded image of a channel to the current group;
- a first retrieval circuit for, in retrieval by specifying a recording time and a channel, performing a primary retrieval process for retrieving a group management information file corresponding to a group including a recorded image of the specified channel and also being closest to the specified time, on the basis of the start times, the end times and the channel distance information corresponding to the specified channel in the respective group management information files; and
- a second retrieval circuit for performing a secondary retrieval process for retrieving a recorded image of the specified channel, the recorded image having a recording time closest to the specified time, on the basis of the index information of the recorded images in the group corresponding to the group management information file found through the primary retrieval process.

2. The image recording and reproducing apparatus according to claim 1, wherein the first retrieval circuit includes

- a circuit for retrieving, as a reference file, a group management information file having a start time and an end time between which the specified time exists, on the basis of the start times and the end times in the respective group management information files,
- a forward retrieval circuit for retrieving a group management information file corresponding to a group including a recorded image of the specified channel and having a smallest file interval from the reference file, out of the reference file and the group management information files which have been created earlier than the reference file, on the basis of the channel distance information corresponding to the specified channel in the reference file and in the group management information files which have been created earlier than the reference file, a backward retrieval circuit for retrieving a group management information file corresponding to a group including a recorded image of the specified channel and having a smallest file interval from the reference file, out of the reference file and the group management information files which have been created later than the reference file, on the basis of the channel distance information corresponding to the specified channel in the reference file and in the group management information files which have been created later than the reference file, and a circuit for determining a group management information file corresponding to a group including a recorded image of the specified channel and being closest to the specified time, on the basis of the results of the retrieval by the forward retrieval circuit and the backward retrieval circuit.

3. The image recording and reproducing apparatus according to claim 1 or 2, wherein the group management information file creation circuit includes an initial-value setting circuit for setting an initial value of the channel distance information for each channel in a first group management information file to a predetermined maximum value, and an updating circuit for updating the channel distance information in each of the group management information files, when the channel of a recorded image included in the group corresponding to the current group management information file is a recorded channel, the updating circuit sets the channel distance information corresponding to the recorded channel to 0, and sets the channel distance information corresponding to the channel other than the recorded channel to the value of the corresponding channel distance information in the group management information file immediately preceding the current group management information file when the value of the corresponding channel distance information in the preceding group management information file is equal to the maximum value or smaller by one than the maximum value, and sets the channel distance information corresponding to the channel other than the recorded channel to a value greater by one than the value of the corresponding channel distance information in the group management information file immediately preceding the current group management information file, when the value of the corresponding channel distance information in the preceding group management information file is neither equal to the maximum value nor smaller by one than the maximum value.

4. An image recording and reproducing apparatus for recording input images of a plurality of channels in such a way as to switch among the plurality of channels during recording and for, every time a single image is recorded in a storage device, storing, in the storage device, index information including the channel of the image, the time when the image is recorded and the address at which the image is stored, the apparatus comprising:

group management information file creation means for, in recording, grouping recorded images at predetermined time intervals and creating, for each group, a group management information file storing group management information including a start time indicating the time when a first recorded image in a group is recorded, an end time indicating the time when a last recorded image in the group is recorded, an address at which index information about the first recorded image in the group is stored, and channel distance information indicating, for each channel, a group interval from a group including a last recorded image of a channel to the current group;

first retrieval means for, in retrieval by specifying a recording time and a channel, performing a primary retrieval process for retrieving a group management information file corresponding to a group including a recorded image of the specified channel and also being closest to the specified time, on the basis of the start times, the end times and the channel distance information corresponding to the specified channel in the respective group management information files; and second retrieval means for performing a secondary retrieval process for retrieving a recorded image of the specified channel, the recorded image having a recording time closest to the specified time, on the basis of the index information of the recorded images in the group corresponding to the group management information file found through the primary retrieval process.

5. The image recording and reproducing apparatus according to claim 4, wherein the first retrieval means includes means for retrieving, as a reference file, a group management information file having a start time and an end time between which the specified time exists, on the basis of the start times and the end times in the respective group management information files, forward retrieval means for retrieving a group management information file corresponding to a group including a recorded image of the specified channel and having a smallest file interval from the reference file, out of the reference file and the group management information files which have been created earlier than the reference file, on the basis of the channel distance information corresponding to the specified channel in the reference file and in the group management information files which have been created earlier than the reference file, backward retrieval means for retrieving a group management information file corresponding to a group including a recorded image of the specified channel and having a smallest file interval from the reference file, out of the reference file and the group management information files which have been created later than the reference file, on the basis of the channel distance information corresponding to the specified channel in the reference file and in the group management information files which have been created later than the reference file, and means for determining a group management information file corresponding to a group including a recorded image of the specified channel and being closest to the specified time, on the basis of the results of the retrieval by the forward retrieval means and the backward retrieval means.

6. The image recording and reproducing apparatus according to claim 4 or 5, wherein the group management information file creation means includes initial-value setting means for setting an initial value of the channel distance information for each channel in a first group management information file to a predetermined maximum value, and updating means for updating the channel distance information in each of the group management information files, when the channel of a recorded image included in the group corresponding to the current group management information file is a recorded channel, the updating means sets the channel distance information corresponding to the recorded channel to 0, and sets the channel distance information corresponding to the channel other than the recorded channel to the value of the corresponding channel distance information in the group management information file immediately preceding the current group management information file when the value of the corresponding channel distance information in the preceding group management information file is equal to the maximum value or smaller by one than the maximum value, and sets the channel distance information corresponding to the channel other than the recorded channel to a value greater by one than the value of the corresponding channel distance information in the group management information file immediately preceding to the current group management information file, when the value of the corresponding channel distance information in the preceding group management information file is neither equal to the maximum value nor smaller by one than the maximum value.

* * * * *